(12) United States Patent
Smith et al.

(10) Patent No.: US 9,323,283 B2
(45) Date of Patent: Apr. 26, 2016

(54) OPERATOR CONTROLLED ELECTRICAL OUTPUT SIGNAL DEVICE WITH VARIABLE FEEL AND HOLD FEEDBACK AND AUTOMATED CALIBRATION AND LEARNABLE PERFORMANCE OPTIMIZATION

(71) Applicant: Prince Industries, Inc., Carol Stream, IL (US)

(72) Inventors: David Paul Smith, Wilmington, IL (US); Chun Feng Xia, Shanghai (CN); Lukasz Grzegorz Osikowicz, Bloomingdale, IL (US)

(73) Assignee: Prince Industries, Inc., Carol Stream, IL (US)

( * ) Notice: Subject to any disclaimer, the term of this patent is extended or adjusted under 35 U.S.C. 154(b) by 142 days.

(21) Appl. No.: 14/169,108

(22) Filed: Jan. 30, 2014

(65) Prior Publication Data

US 2014/0214273 A1    Jul. 31, 2014

Related U.S. Application Data

(60) Provisional application No. 61/758,489, filed on Jan. 30, 2013.

(51) Int. Cl.
*G05G 1/04* (2006.01)
*G05G 5/03* (2008.04)
(Continued)

(52) U.S. Cl.
CPC .................. *G05G 9/047* (2013.01); *G05G 5/03* (2013.01); *G05G 9/04737* (2013.01); *G05G 1/04* (2013.01);
(Continued)

(58) Field of Classification Search
CPC .... G05G 1/04; G05G 5/02–5/06; G05G 7/00; G05G 9/00; G05G 9/02–9/04; G05G 9/047–9/053; G06F 3/016; G06F 3/0213; G06F 3/033; G06F 3/0338; G06F 3/038; G06F 2203/015; H01H 2003/008; H01H 2221/012; A63F 2300/1037; A63F 13/285; A61B 2019/2276; A61B 2019/2292
See application file for complete search history.

(56) References Cited

U.S. PATENT DOCUMENTS 5,029,778 A * 7/1991 DeLuca ........................ 244/234
5,223,776 A * 6/1993 Radke et al. ............... 318/568.1
(Continued)

OTHER PUBLICATIONS

Florez et al. Calibration of force sensing resistors (fsr) for static and dynamic applications, Sep. 2010, IEEE, 2010 Andescon Conference Proceedings.*
(Continued)

*Primary Examiner* — Fadey Jabr
*Assistant Examiner* — Kevin P Mahne
(74) *Attorney, Agent, or Firm* — Barich IP Law Group

(57) ABSTRACT

An output signal device and method that provides the operator force feedback similar to a pilot control joystick. These force feedback regions include free play, dead-band start of modulation, modulation, fore-warning bumper and hold near max angle. This output signal device may also vary the fore-warning feel and hold positions to be at any angle. This output signal device uses force sensing as the signal and has force slope changes used as auto-calibration of the output signal. This improves signal accuracy and provides a service prognostic signal. The prognostic signal may be used to activate redundant sensor. The variable force feedback may improve operation on rough terrain. The force feedback, may allow more productive operating positions to be learned. This enables productivity and other important job site criteria such as fuel usage to be optimized by interactive communication with this output signal device.

9 Claims, 14 Drawing Sheets

(51) Int. Cl.
*G05G 9/047* (2006.01)
*G06F 3/01* (2006.01)

(52) U.S. Cl.
CPC .............. *G05G 2009/04762* (2013.01); *G05G 2009/04766* (2013.01); *G06F 3/016* (2013.01); *G06F 2203/015* (2013.01); *Y10T 74/2051* (2015.01)

(56) References Cited

U.S. PATENT DOCUMENTS

| | | | | |
|---|---|---|---|---|
| 5,828,363 | A | 10/1998 | Yaniger et al. | |
| 6,005,551 | A * | 12/1999 | Osborne | G06F 3/016 345/161 |
| 6,098,481 | A * | 8/2000 | Mills | G05G 9/047 74/471 XY |
| 6,394,431 | B1 * | 5/2002 | Smith | G05G 5/03 267/136 |
| 8,050,780 | B2 * | 11/2011 | Tessier | B64C 13/04 244/229 |
| 2002/0011815 | A1 * | 1/2002 | Gaffney et al. | 318/560 |
| 2006/0191775 | A1 | 8/2006 | Edmunds | |
| 2008/0256941 | A1 * | 10/2008 | Bertolasi et al. | 60/422 |
| 2009/0153370 | A1 * | 6/2009 | Cooper | G05G 9/047 341/21 |
| 2010/0005851 | A1 * | 1/2010 | Cottles et al. | 73/1.57 |
| 2011/0092830 | A1 * | 4/2011 | Chen | A61B 5/0225 600/490 |
| 2011/0155861 | A1 | 6/2011 | Antraygue | |
| 2011/0226087 | A1 * | 9/2011 | Hori | E02F 9/2004 74/523 |
| 2012/0053735 | A1 * | 3/2012 | Tessier | B64C 13/04 700/275 |
| 2012/0158279 | A1 * | 6/2012 | Faivre et al. | 701/124 |
| 2012/0205165 | A1 | 8/2012 | Strittmatter et al. | |

OTHER PUBLICATIONS

PCT, Notification of Transmittal of the International Search Report and the Written Opinion of the International Searching Authority, or the Declaration, in International Application No. PCT/US2014/013961 dated Jun. 25, 2014.

* cited by examiner

OPERATOR CONTROLLED ELECTRICAL OUTPUT SIGNAL DEVICE WITH VARIABLE FEEL AND HOLD FEEDBACK AND AUTOMATED CALIBRATION AND LEARNABLE PERFORMANCE OPTIMIZATION

CROSS-REFERENCE TO RELATED APPLICATIONS

The present application claims the benefit of U.S. Provisional Application € No. 61/758,489, filed Jan. 30, 2013, entitled "Operator Controlled Electrical Output Signal Device With Variable Feel and Hold Feedback and Automated Calibration and Learnable Performance Optimization", which is hereby incorporated by reference in its entirety.

BACKGROUND OF THE INVENTION

The present invention generally relates to an operator controlled signal output device. More specifically, the present invention relates to such a device having variable feel and hold feedback, automatic calibration, and learnable performance optimization.

Some prior art devices are able to provide variable feel such as the "Operator Controlled Electrical Output Signal Devices" shown in U.S. Pat. No. 5,875,682. However, a drawback with current devices is that the electromagnetic hold is created with a small moment arm. This requires large electric coils, which take up space, cost and heat. On the other hand, if the coils are kept small, then the hold force is too low.

Additionally, sometimes an external bump of the vehicle being controlled may cause the position to move towards hold. This may not be desired by the operator.

To address this concern the current field of technology adds notches into the coil face. This may create clicking feedback to the operator that is not smooth and may not be desired.

Also the current field uses force sensing resistors, but they are configured on torsional springs. This configuration is based on a single pre-loaded spring. This means that the force feedback to the operator does not have the typical free play, dead band and start of spring force ranges that are typical with pilot input devices. This torsional spring is different than most current pilot control input devices. This means that there is no part in common with current pilot control joysticks, which is undesirable for ease of training operators and intuitive understanding of the controls. Also the torsional spring may not completely align with the force sensing resistor which may cause stress that reduces the sensor life below a desired level. Alternatively, the prior art may use force sensing but not have multiple springs to create sometimes desired operation force feedback. The prior art may also use a pilot control which may have the desired operation force feedback but this requires pilot supply and tank lines that take up cab space and add system cost.

Some electronic output devices use buttons to trigger functions such as implement float. However, this may cause inadvertent implement sudden drop motions as compared to pilot controls that have detent forewarning bumpers.

Other electrical output devices use other types of sensors, such as Hall effect or other types of position sensors. These electrical output devices are not able to auto calibrate for improved accuracy. They also are hard to configure redundant sensing for application that require a secondary sensing system.

Additionally, these input devices do not offer variable feel feedback nor lever position optimization and learnable feedback to the operator.

BRIEF SUMMARY OF THE INVENTION

One or more of the embodiments of the present invention provide a Joystick Electronic System (JSE) that provides the operator force feedback similar to a pilot control joystick. These force feedback regions include free play, dead-band start of modulation, modulation, fore-warning bumper and hold near max angle. The JSE may also vary the fore-warning feel and hold positions to be at any angle. The JSE uses force sensing as the signal and has force slope changes used auto-calibration the output signal. This improves signal accuracy and provides a service prognostic signal. The prognostic signal may be used to activate redundant sensor.

DETAILED DESCRIPTION OF THE INVENTION

Figure 2:
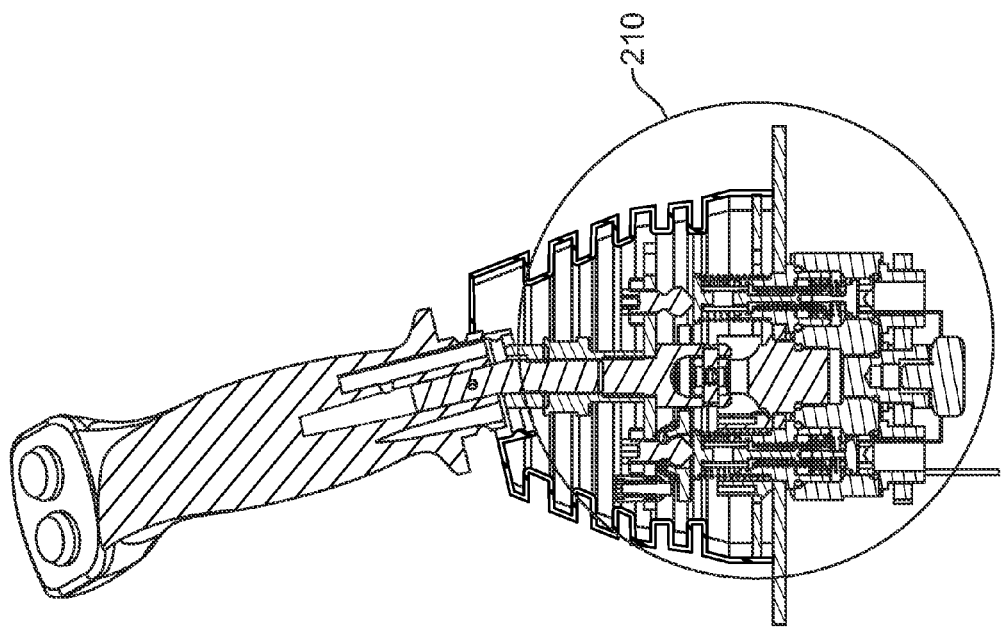
FIG. 2 illustrates a rotated, cut-away view of the JSE of FIG. 1.

One or more embodiments of the present invention address the above short comings, issues and concerns of the current field. Hereafter, one or more embodiments of the present invention may also be referred to as Joystick Electronic System or JSE.

The JSE uses force sensing in a linear (not torsion) application of load. This allows the pivot mechanism to be common with current pilot output joysticks. The pivot mechanism then actuates a linear plunger that has various linear springs and loads connected. These spring loads include: return, bias, modulation and compliant type loads. The result is typical feel feedback that is similar to current pilot control joysticks and single lever devices (well known in the field).

As further described below, detent bumper mechanisms and hold coils may be included. This provides the added feature of force feedback to prevent inadvertent full lever motion and improve operator performance.

Then, upon full lever motion the hold coil may hold the lever in position reducing or eliminating the arm force required by the operator. This hold at full lever position may be electrically activated and de-activated providing additional functionality.

The variable hold and force feedback coils are configured on a large spherical cup. This increases the holding moment arm such that the holding force is large enough to not move when the vehicle has external g-loads. This larger force is also sometimes desired for feedback to the operator.

The variable hold force may be used for both warning bumper feel to the operator and as variable hold of the handle lever at various angles. The variable warning bumper may use inputs from other JSE's or from the vehicle or from the job site. This allows a Central Processing Unit (CPU) to position the warning bumper feel feedback at optimum and/or desirable positions. This may be used to reduce engine lug, optimize fuel noise made or vehicle performance, for example. The variable hold feature may reduce an operator signal position to a reduced position that is more optimum during a particular construction cycle.

The input used to create the output signal is preferably linear force sensing. This may be done, for example, using force sensing resistors (FSR). These FSR pads have many cells so that the signal generation is very reliable. If a few of the cells are damaged, the JSE may automatically adjust the output signal and use the cells that remain. This automatic calibration feature also improves the accuracy of the device.

Sometimes an application requires the signal generation to be redundant. This kind of parallel logic may be accomplished by stacking an extra FSR pad in series with the primary FSR signal pad.

The automatic calibration feature may also be used as service prognostics and for switching the signal from the primary to the secondary sensors. A series stacking of input pads is a configuration advantage over all other electric output signal devices that use position sensing.

One embodiment of the JSE includes a pivot mechanism, a spring and plunger mechanism and a force sensing mechanism as shown in the appended Figures. The pivot method may be a typical u-joint for joystick or pivot pin for single axis devices, for example. This embodiment does not include the hold feature nor the variable feel feedback features (which are included in the second and third embodiments discussed below, respectively). The lever effort torque versus angle of this first embodiment includes the typical: free-play, dead band, modulation range, and jump-up regions. This is similar to current pilot output joystick devices. These variations in lever efforts are known to operators and are desired in electrical output signal device.

The second embodiment of the JSE includes the hold at a pre-determined angle and a forewarning "bumper" feedback force to the operator. Again these features are known to operators using pilot output joysticks and are desired on applications of an electric output signal device. This forewarning force feedback allows the operator to avoid triggering a sudden motion such as implement float position. The hold feature then allows the operator to keep a special application such as float in effect. This reduces the arm force required and therefore reduces operator fatigue. This embodiment has hold coils that may need to be aligned. Therefore the pivot mechanism may be a spherical pivot joint for reduced undesired motion. The spherical pivot mechanism may have a pin in a slot to prevent or limit twist motion.

The third embodiment of the JSE includes the variable force feedback. In this embodiment, the force felt by the operator may be varied to any amount from zero to full at any angle. The hold at full angle may be set at any angle. Also the "bump" feature may be programmed using other vehicle parameters. For example, when the vehicle motion is smooth the feel feedback forces may be low. When the vehicle motion is rough, the force feedback may be increased. Some operators prefer lighter efforts and others more heavy efforts. Further, the machine being operated may have various materials being handled and various applications. The amount of feel feedback may be varied with the: operator, the machine, the material and the various applications as further described below. Additionally, some applications have safety limits such as max speed of a winch motor. The variable force may be used to prevent operation at that is above predetermined safe limits. Some operating limits vary with other parameters such as temperature. To prevent component damage the safe operating limits may vary with parameters such as operating temperature. Laser plane, GPS Global Position Sensing, cut-to-contour, vision systems and others all may send signal to and receive signals from the JSE's on one and multiple machines. The variable force to move the joystick may be used to help prevent unwanted machine operations and may also be used to optimize desired work done. This type of feedback is safe because the operator may over-ride the variable force by applying more push or pull force on the JSE.

When a lever is released, it may typically over shoot the zero hold position and actuate the opposite direction. Additionally, a lever overshoot may cause a machine motion that actually creates another lever overshoot. This may be sensed by the rate of change of angle position and a force programmed near zero such that the lever can't actuate the opposite direction. The alignment of the spherical cup and the pivot point is used to apply various amounts of motion hold forces. Therefore, this embodiment may also use the spherical pivot that has the pin or ball to limit twist motion.

A fourth configuration of the JSE applies to the first, second and third and sixth embodiments. More specifically, when an application needs extra reliability for safety or other known reasons, the JSE may have one or more redundant signal sensor added in one or any of the directions measured. This is done by adding another force sensing pad in series with the primary force sensing signal pad. The typical accuracy of a force sensing pad is 10%. This may be reduced to about 1% by using the slope changes of the output signal. When the slope changes at start position creating an inflection point after the free-play region, this may be calibrated using electronic null adjustment. Then when the slope again changes at jump-up position this second inflection point may also be sensed. The subtraction of the jump-up and the start inflection point positions may be used as gain adjustment. This active null and gain adjustments improves the overall accuracy of a typical electric output signal device from 10% to 1%. Then over time if some of the force sensing cells are damaged and/or the pivot mechanism and/or the contact point have wear, the null and gain may be continuously adjusted. Then when the null and gain is adjusted more than a pre-determined amount, say 10%, the control may send out a prognostic service signal. Then if present the control may switch from the primary force sensing signal to the secondary signal. The accuracy improvement logic may also be applied directly to embodiments one, two, three and six with only a single force sensing pad in each JSE operating directions.

The fifth embodiment of the JSE applies to the third and fourth embodiments. In this embodiment, the signal output from one or more JSE's in either analog or digital form may be communicated by either wired or wireless communication to a CPU(s). Additionally, other inputs and outputs from one or more vehicles and the typical construction jobsite(s) may also be communicated in known manor to the CPU(s). These input/outputs may include but not limited to: JSEs, valve positions, GPS (global position sensing), other local position sensing signals, laser plane, accelerometer, engine speed vehicle speed, sound sensors, circuit pressures, cylinder positions, pedal positions, lever positions, and switch positions, etc.

The input feel may be increased by the CPU at any angle such that the input torque from the operator is increased or felt by the operator. This force increase may serve as a bumper feel feedback to the operator. A simple example is when one JSE has a high input another JSE may have the bumper feel feedback position reduced so that system flow priority may go to the one of the other JSE input functions. Also once an operator makes an input, the CPU may calculate a more optimum position for that input.

A typical example of this is a repeated loading cycle. When a bucket is nearing a pre-determined level position the rack-back lever position may have the hold reduced to a lesser angle. Then when the bucket is level and the rack-back is slid into hold position the bucket stop of rack motion may be more smooth preventing dirt from falling out. This reducing of the rack-back may be felt by the operators hand and the operator may use this to make other inputs such as shifting from reverse to forward. The operator may also learn the improved lever positions so that the operator's inputs on a similar cycle are improved.

Once the bucket is level it typically also needs to be raised to a dump height. This is typically done while the vehicle is moving forward. This takes engine power management. The raise speed may be slid into a reduced position to provide more engine power to vehicle propel. Power management may also be used to improve: fuel, noise and emissions. Also the raise speed may be slid to a position that puts the bucket at dump height just before the vehicle needs to stop at the truck or hopper. The operator may also push a handle button to signal the CPU to create or turn off a bumper or hold position. In all cases the input is safe because it is initiated by the vehicle control operator. Also the operator may always override a lever held at an angle by applying a lever centering force or by hitting a hold release button.

Thus, the first embodiment shows a joystick that may produce a feel curve for this electric output signal device that is very similar to that of a pilot pressure output signal device currently used in many applications. The curve shows the typical torque values and angle values for the free-play, dead band, modulation range and jump-up regions.

The second embodiment shows a joystick configuration that includes the forewarning bumper and hold at near full angle. The curve of lever effort versus angle adds the forewarning bumper load and the hold near full angle as a negative load.

The third embodiment shows a joystick configuration that includes the variable force feedback feature. The curve of lever efforts may be varied for various applications. The hold may be at any angle. Forewarning bump may be at any angle. The velocity of lever motion may be used to produce a holding force near hold that prevents the handle from overshooting in the opposite direction.

The fourth embodiment uses any of the first three embodiments, the sixth embodiment, or any other embodiments. The control module may detect the near vertical slope of the start position. This may be used to adjust null. Then when the signal is above mid-point and the slope is again detected as near vertical the jump-up position may be noted. Then the jump-up position minus the start position may then be noted as the gain. This null and gain adjustments may then be used to improve the accuracy of the device. It may also be used to send a prognostic signal when the unit needs service. It also may be used to switch the signal used from the primary sensor to the secondary sensor. More or fewer redundant sensors may be configured on actuation directions.

The fifth embodiment applies to the variable hold embodiments three and four. The CPU may provide feedback to the operator in the form of input bump feel at predetermined positions. The CPU may also reduce an input lever position by reducing the variable hold voltage such that the lever slides to a reduced predetermined angle. This sliding of the lever handle is another form of feedback to the operator to help optimize the vehicle functions. The operator may use buttons to turn on or off the bump and slide features and also to set them at new lever positions.

Figure 1:
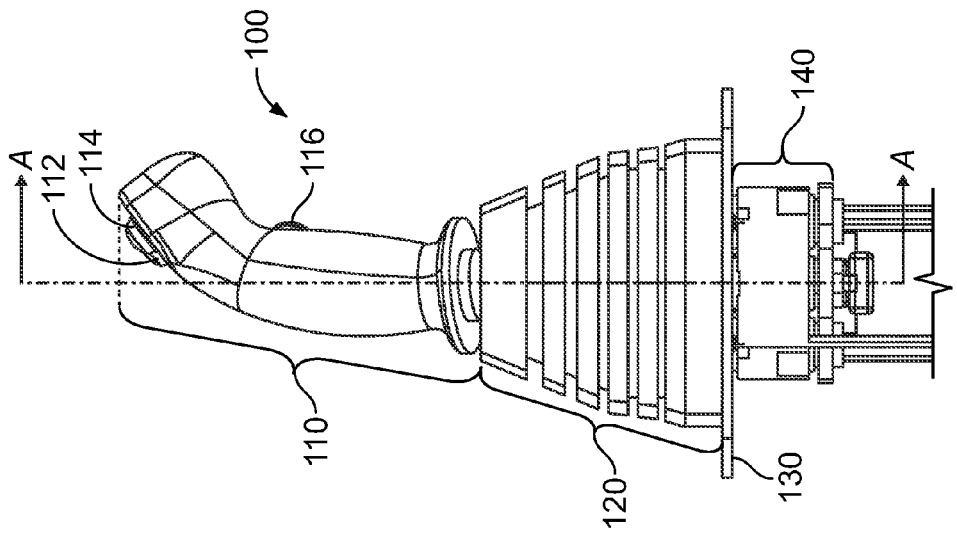
FIG. 1 illustrates an exterior view of an embodiment of the Joystick Electronic System (JSE) according to a first embodiment of the invention.

FIG. 1 illustrates an exterior view of an embodiment of the Joystick Electronic System (JSE) 100 according to a first embodiment of the invention. The JSE 100 includes a user interaction portion 110, a flexible boot 120, and attachment plate 130, and a control portion 140. Additionally, the user interaction portion 110 includes a first top button 112, a second top button 114, and a trigger button 116.

FIG. 2 illustrates a rotated, cut-away view of the JSE 100 of FIG. 1. FIG. 2 also shows a detail region 210 that is presented in a close-up view in FIG. 3.

Figure 3:
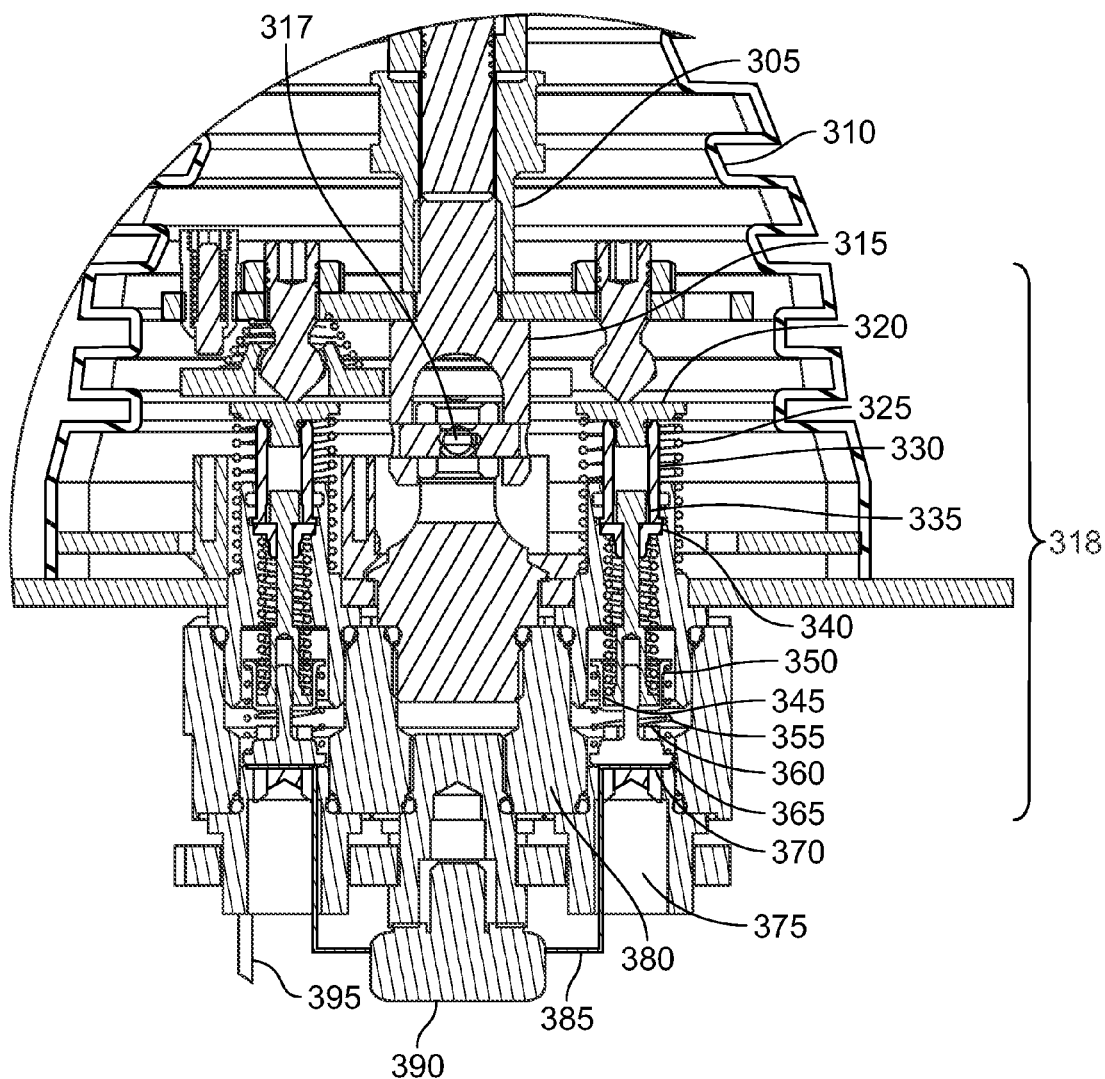
FIG. 3 illustrates a detailed cut away of the JSE of FIG. 1.

FIG. 3 illustrates a detailed cut away of the JSE 100 of FIG. 1. As shown in FIG. 3, the JSE 100 includes a handle assembly 305, a boot 310, a pivot assembly 315, a pivot point 317, a displacement system such as a force sensing cartridge 318, a body 380, a FSR signal connector 385, a control module 390, and wire harness connector 395. The force sensing cartridge 318 includes a plug 320, a displacement setscrew pin 322, a return spring 325, a plunger 330, a spring retainer 335, a slit retainer 340, a modulation spring 345, a cup 350, a bias spring 355, a compliant washer 360, a Force Sensing Resistor (FSR) retainer 365, a FSR 370, and an adapter 375.

In operation, the handle assembly 305 connects to the user interaction portion 110 and is responsive to user displacement of the user interaction portion 110. The handle assembly preferably includes actuation and may include buttons as illustrated above.

The boot 310 surrounds the other components shown in FIG. 3 and acts as a dust and moisture cover.

The pivot assembly 315 allows the handle assembly 305 to pivot around the pivot point 317 relative to the body 380. The pivot assembly may be a u-joint or spherical type joint for example.

The force sensing cartridge 318 includes the plug 320 in contact with or near contact with the displacement setscrew pin 322. The displacement setscrew pins 322 are rigidly connected to the handle assembly. Thus, the plug 320 may push against the displacement setscrew pins 322 to move the handle assembly and the handle motion may move the pin 322. As further described below, there is a plug 320 on either side of the pivot point 317. The plugs 320 may be displaced upward or downward in order to pivot the handle assembly 305 about the pivot point 317. For example, in the embodiment shown in FIG. 3, to pivot the handle assembly counter-clockwise, the plug on the right may be displaced upward until it reaches the free-play position then the handle is in hold center position. A handle pivoted counterclockwise may be moved clockwise until the left plug reaches its free-play region and again the handle is in hold position. The operator may move the handle in the counter clockwise direction and the left plug 320 makes contact and creates downward motion of the left cartridge 318 and a clockwise movement to the handle makes contact with the right plug 320 and causes downward motion of the right cartridge.

The force sensing cartridge 318 also includes a plunger 330 that may be pushed by the plug 320 downward from a Hold position to a Full Shift position. As shown in FIG. 3, the plunger 330 is connected to the plug 320 and thus the plug 320 moves with the plunger 330. The return spring 325 operates to reset the plunger 330 to the hold position when the load down on the plug 320 is less than the loads up from the springs 325, 345, 355 and compliant washer 360 as further described below.

The spring retainer 335 and retainer split 340 operate together to pre-load the modulation spring 345. The modulation spring 345 is used for linear force input.

The cup 350 centers the spring retainer 335 and the bias spring 355. The gap between the pin 322 and the plug 320 is the free-play region and when contact is made the dead band region begins. The force at this start of dead band is higher because of pre-load on the return spring 325.

As the plug 320 moves down the retainers 355, 340, spring 345 and cup 350 compress the bias spring 355. When the cup 350 contacts the compliant washer 360 the dead band region is over and the modulation region begins. The force rate of change has a slope change at the start of this modulation region. When the plug 320 pushes the split retainers 340 down against the modulation spring 345 there is compression of the modulation spring 325. The gap between the retainers 340 and 335 reduces. When contact is made between the bottom of retainers 340 and the step in the middle of 335 there is direct contact made on the compliant washer 360. The effective spring rate of the compliant washer 360 may be significantly higher than the springs 345 and 355. This sudden increase in slope caused by the high spring rate on the compliant washer 360 starts the jump up region. This second force inflection point is at the end of the modulation region. Thus there are force slope inflection points at the start and end of the modulation region.

The FSR 370 provides a force sensing signal relative to the pivotal displacement of the handle assembly 305. This force signal has one or more start inflection points at start of the modulation range and a jump-up inflection point at the end of the modulation range, created by the motion and mechanism described above. The FSR 370 is maintained in position by the adapter 375 and FSR retainer 365

The FSR signal connector 385 relays the FSR signal from the FSR 370 to the control module 390. The wire harness connector 395 connects the control module 390 to the CPU, shown below.

In one example of operation of the JSE, the handle assembly 305 is moved by a user and takes up the adjusted clearance or free-play between the pivot assembly 315 and the top plug 320. This is known as the free-play region.

The contact with the plug 320 causes the plunger 330 to move down against the return spring 325. This starts the Dead band region. Putting it another away, at this angle of deflection, the force to angle curve shown in FIG. 4 below is in the region identified as the dead band region. Next, as the angular displacement is increased, the inner parts (retainer split 340, modulation spring 345, and cup 350) in contact with the spring retainer 335 all move down together against the bias spring 355. When the cup 350 contacts the compliant washer 360 the dead band region is over and the modulation range begins.

The split spring retainers 340 then slide on the cup 350 compressing the modulation spring 345. This modulation range continues until the bottom of the split retainers 340 contact the shoulder on the cup 350. This then changes the spring rate from the modulation spring 345 to that of the compliant washer 360. This sudden increase in spring rate starts the Jump-up region of the curve shown in FIG. 4.

Figure 4:
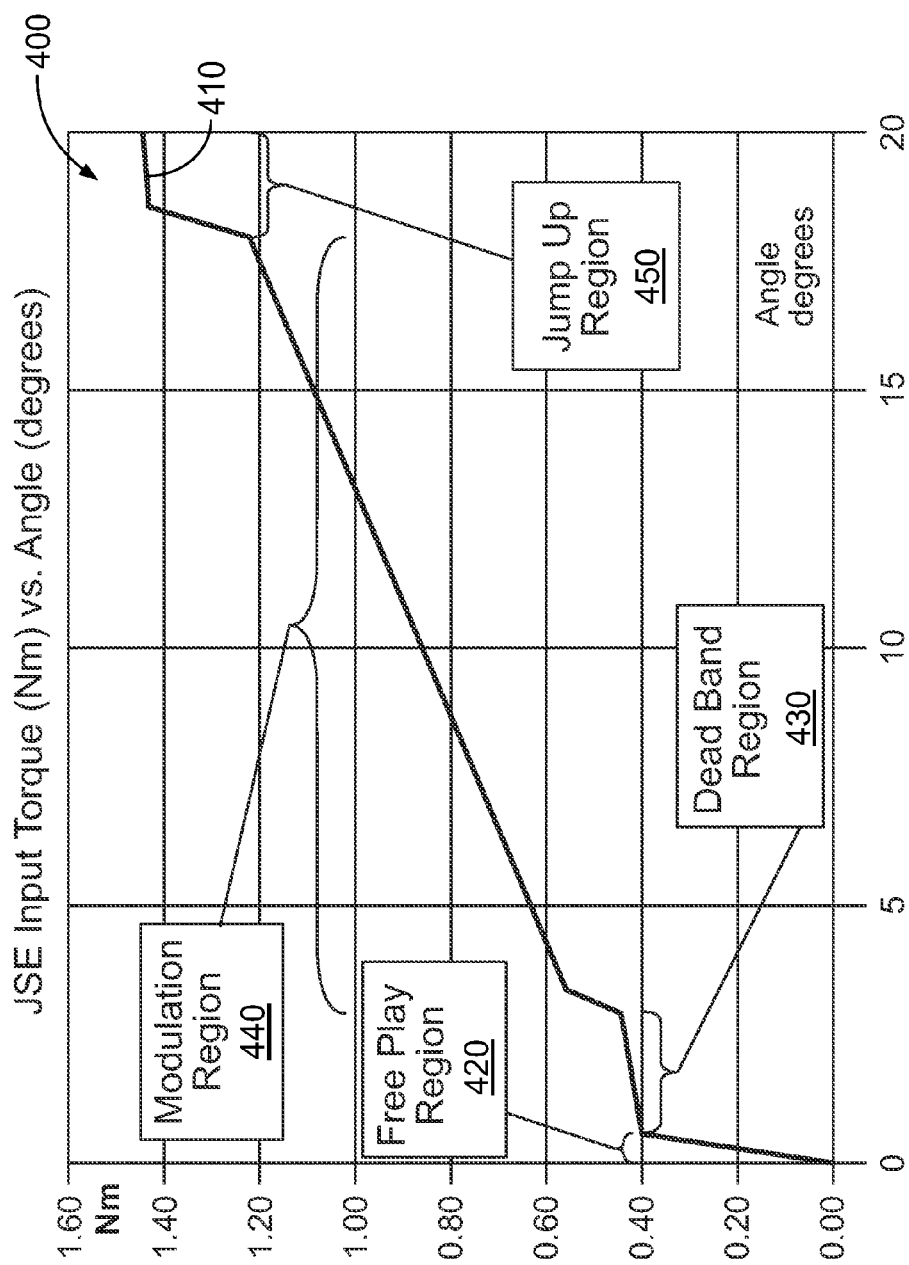
FIG. 4 is a diagram showing an input torque vs. angle of actuation curve.

FIG. 4 is a diagram 400 showing an input torque vs. angle of actuation curve 410. The horizontal axis illustrates the angle degrees of displacement of the handle assembly from its initial position. The vertical axis illustrates input torque measured in Newton-meters. As shown in FIG. 4, the diagram 400 includes four regions, a free play region 420, a dead band region 430, a modulation region 440 and a jump up region 450.

In the free play region 420, the user may increase the torque applied to the JSE from zero to 0.40 Nm with a minimal angular deflection of the handle assembly. Thus, small torque forces are mostly ignored and/or filtered out by the JSE. This may be desirable to the user so that bumping and jostling of the cabin that often occurs on the work site, which may cause the user to displace the handle assembly undesirably, does not translate into angular movement of the handle assembly.

In the dead band region 430, the angular deflection changes quickly with a small increase in applied torque. This may produce a desirable rapid "turn on" effect to a user. This provides torque of force feedback to the operator's hand that the JSE is about to produce a signal that creates an implement of other vehicle motion. The torque differences from free-play to dead-band to modulation forms a familiar "ready-set-go" feedback to the operators hand that is common on pilot controls and very useful in productive vehicle operation.

In the modulation region 440, angular displacement proceeds substantially uniformly with increasing torque. The modulation region thus represents the typical "working region" during which a user may be operating the JSE.

In the jump-up region 450, the torque needed to produce an angular displacement greatly increases. Thus, the jump-up region 450 may be used to provide tactile feedback to an operator that the controlled motion is nearing the end of its operable range, for example.

The return spring may at any angle return the handle to the hold position that is in the free-play region. Return is whenever the operator input force is lower than the net springs 325, 345, 355 and washer force 360 and friction forces of the boot 310 and the other moving parts. Also return to a lower angle may be done by the operator applying a pull instead of push force on the handle 305. A lever let-go is when the operator hand force is removed and the spring forces 345 and 355 return the handle to hold or free-play position.

Figure 5:
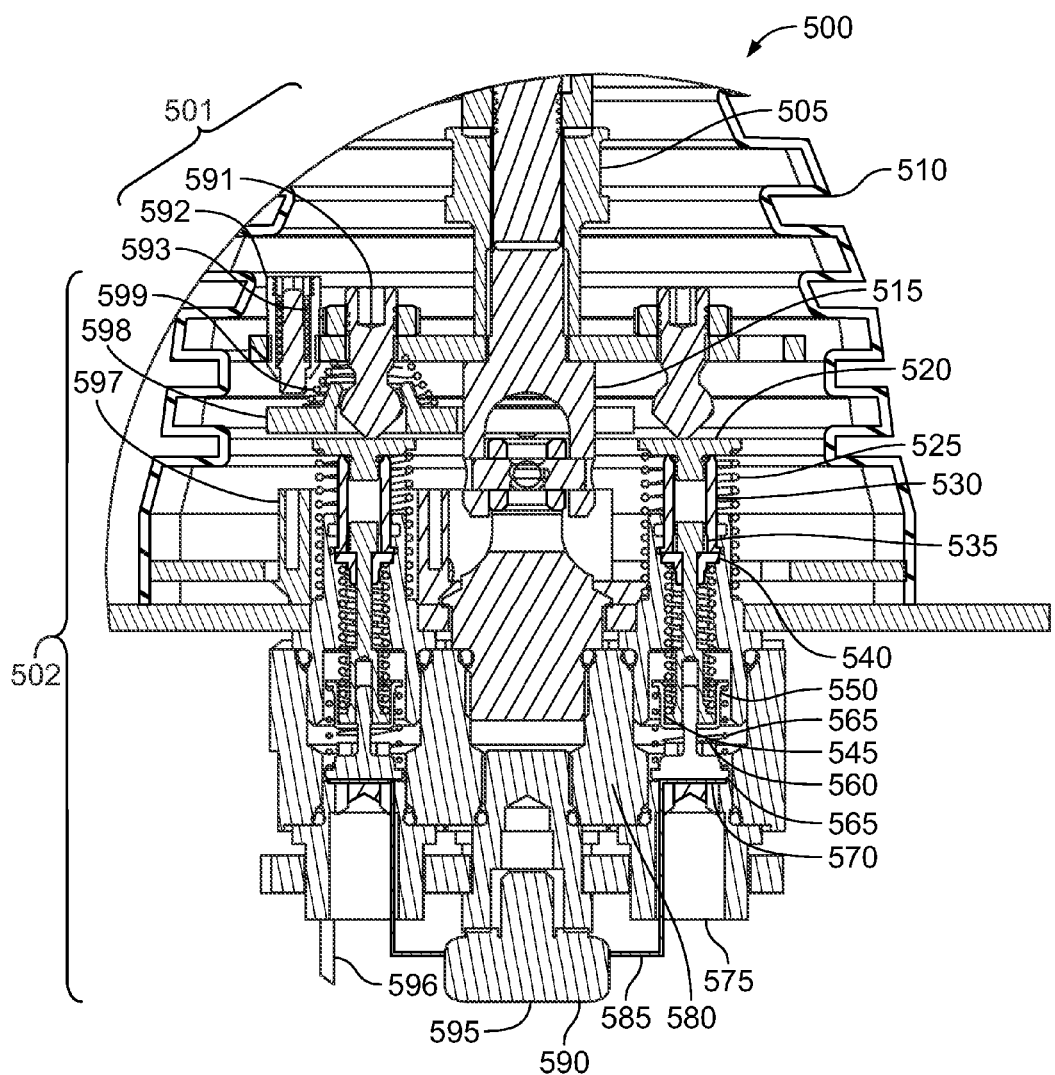
FIG. 5 illustrates a detailed cut away of a second embodiment of the JSE.

FIG. 5 illustrates a detailed cut away of a second embodiment of the JSE. Similar to the JSE shown in FIG. 3, the JSE 500 includes a handle assembly 505, a boot 510, a pivot assembly 515, a pivot point 517, a displacement system such as a force sensing cartridge 518, a body 580, a FSR signal connector 585, a control module 590, and wire harness connector 595. The force sensing cartridge 518 includes a plug 520, a displacement setscrew pin 522, a return spring 525, a plunger 530, a spring retainer 535, a retainer split 540, a modulation spring 545, a cup 550, a bias spring 555, a compliant washer 560, a Force Sensing Resistor (FSR) retainer 565, a FSR 570, and an adapter 575. All of these elements function generally similarly to those discussed above with regard to the JSE 100 of FIG. 3.

However, the JSE 500 additionally includes detent bumper system 501 and a hold coil system 502. The hold coil system 502 includes a hold coil wire 596, a hold coil assembly 597, a hold clapper plate 598, and a clapper spring 599. The detent bumper system 501 includes an actuation pin 591, a detent bumper assembly 592, and a detent spring 593.

In operation, the hold coil assembly 597 may be an electromagnetic hold coil that, when activated, generates a magnetic attraction with the hold clapper plate 598 in order to provide a resistance to a force attempting to angularly displace the handle assembly. The hold coil assembly 597 may be actuated by power provided by the hold coil wire 596. The hold clapper plate 598 may be centered by the clapper spring 599.

The clapper plate 598 is retained by a spherical portion on the actuation pin 591. This allows the hold coil magnetic force to hold the handle 505 at a predetermined position. This position of the handle will be held until the electrical power to the hold coil 597 is reduced or the operator pulls the handle out of hold region. This pull-out region is short and is the transition from hold region to the return region.

Additionally, the detent bumper assembly may provide a forewarning bump in force to a user. This may be provided by the detent bumper assembly 592 and the detent spring 593. The detent bumper assembly 592 contacts the top of the clapper washer 598. The detent spring 593 has a pre-load that creates the bump force.

In one example of the operation of the second embodiment of the JSE, the handle assembly 505 is moved to the left and goes through the free play, dead band and modulation regions as previously described. Then the hold clapper plate 598 contacts the top of the hold coil assembly 597 and starts to pivot. This then causes contact of the clapper plate 598 with the bottom tip of the detent bumper assembly 592.

Inside of the detent 592 there is a pre-loaded spring 593. This contact then starts the Forewarning Bumper Feel Region. This detent bumper 592 is adjustable and is typically adjusted just prior to the jump-up region. The jump-up region was previously described. Further motion of the handle allows the clapper 598 to align with the hold coil 597. The magnetic force then starts the hold region of the curve show in FIG. 6. A pull force is required to de-latch the coil in the pull-out region. Then the return spring 325 causes a positive force on the handle to hold the angle or the control of the handle assembly returns to hold or the free play region.

Figure 6:
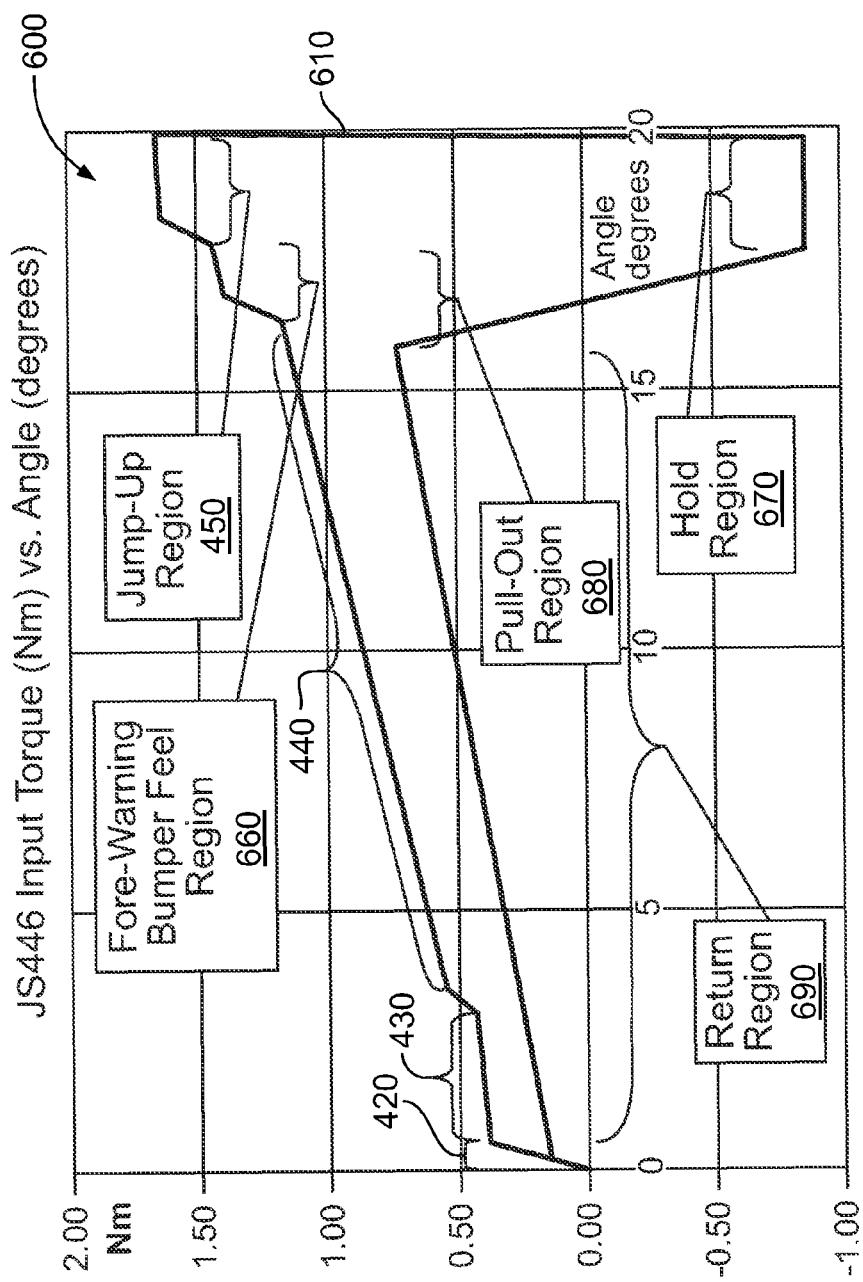
FIG. 6 is a diagram showing an input torque vs. angle of actuation curve, similar to that shown in FIG. 4.

FIG. 6 is a diagram 600 showing an input torque vs. angle of actuation curve 610, similar to that shown in FIG. 4. As with FIG. 4, the horizontal axis illustrates the angle degrees of displacement of the handle assembly from its initial position. The vertical axis illustrates input torque measured in Newton-meters. As shown in FIG. 6, the diagram 600 includes the four regions shown in FIG. 4 (a free play region 420, a dead band region 430, a modulation region 440 and a jump up region 450) as well as the addition of a fore warning bumper feel region 660, a hold region 670, a pull-out region 680, and a return region 690.

In the fore warning bumper feel region 660, the torque needed to produce an angular displacement greatly increases. Thus, the fore warning bumper feel region 660 may be used to provide a tactile forewarning to an operator that the controlled motion is nearing the end of its operable range, for example. This also forewarns that the jump-up region is about to begin. The jump-up region sometimes actuates sudden vehicle implement motions such as implement float. When a vehicle implement like a blade for example is supported by the ground the float function is not sudden but if float is actuated when the implement is above the ground sudden inadvertent drop may occur. The forewarning bump feedback force may prevent the inadvertent drop.

In the hold region 670, once the full angle of displacement has been reached, the user no longer needs to apply force to maintain the angle. Further, once the user wishes to move the handle assembly out of the hold region, the user must apply a force opposite the direction of displacement of the handle assembly. This is illustrated in FIG. 6 as the negative force shown in the lower portion of the curve. Additionally, as shown, the hold region allows some displacement from the actual hold position, such as 1-5% of angle, before the hold is released.

Once the user has applied sufficient force to move the angular displacement out of the hold full angle region 670. The handle is in the return region. In this region the operator must apply a positive force on the handle 505 or the handle will return to the hold or free-play position.

Figure 7:
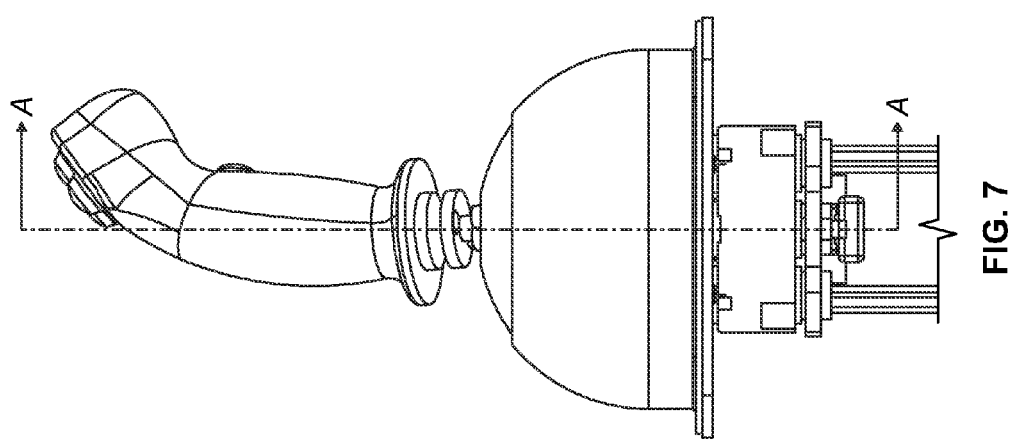
FIG. 7 illustrates an exterior view of a third embodiment of the JSE.

FIG. 7 illustrates an exterior view of a third embodiment of the JSE. The JSE 700 of FIG. 7 is generally similar to the JSE 100 of FIG. 1 and includes the components shown in FIG. 1, but additional components as further discussed below.

Figure 8:
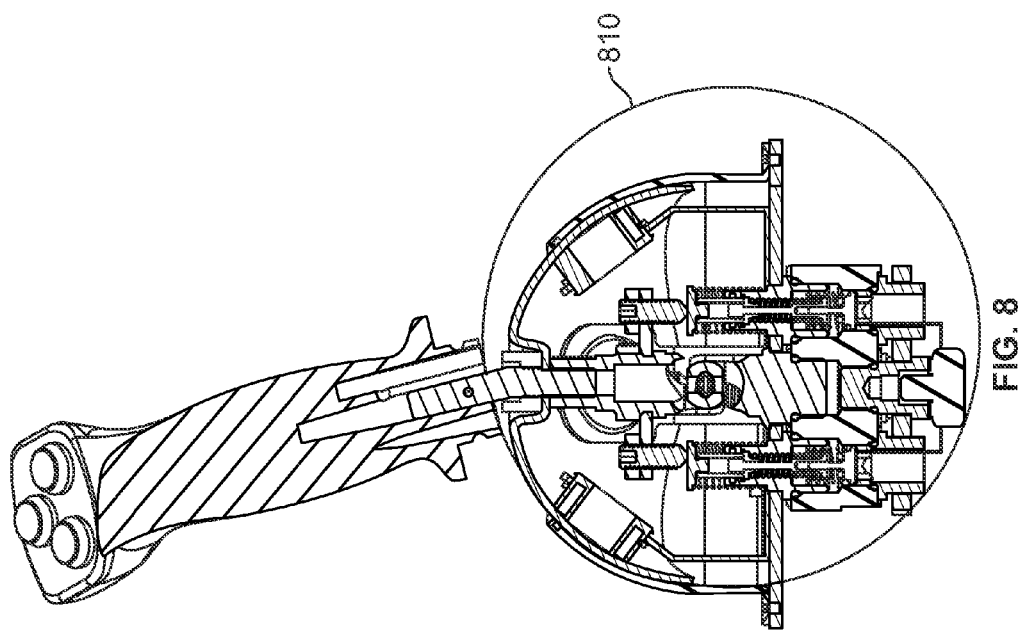
FIG. 8 illustrates a rotated, cut-away view of the JSE of FIG. 7.

FIG. 8 illustrates a rotated, cut-away view of the JSE 700 of FIG. 7. FIG. 8 also shows a detail region 810 that is presented in a close-up view in FIG. 9.

Figure 9:
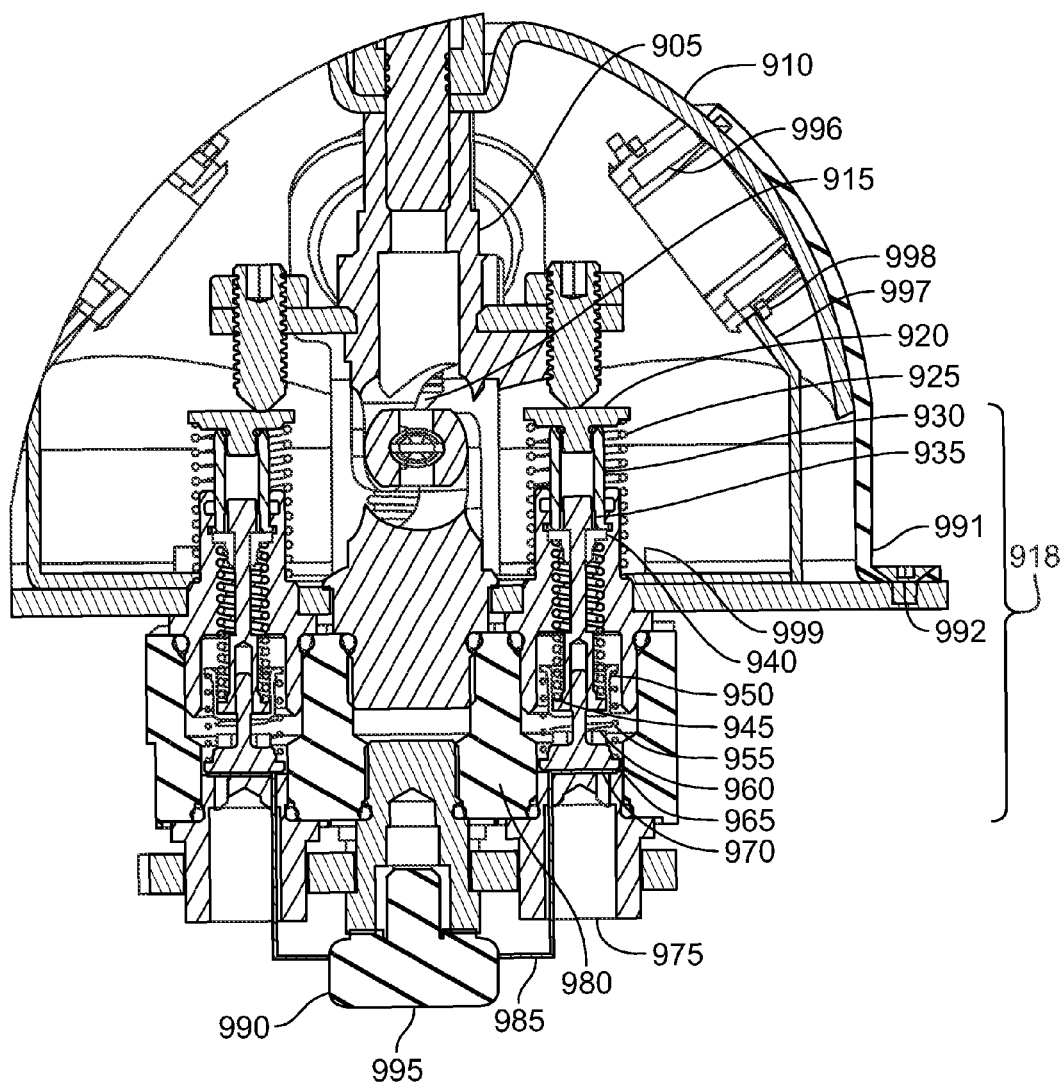
FIG. 9 illustrates a detailed cut away of the JSE of FIG. 7.

FIG. 9 illustrates a detailed cut away view of the JSE 700 of FIG. 7. Similar to the JSE shown in FIG. 1, the JSE 700 includes a handle assembly 905, a pivot assembly 915, a pivot point 917, a displacement system such as a force sensing cartridge 918, a body 980, a FSR signal connector 985, a control module 990, and wire harness connector 995. The force sensing cartridge 918 includes a plug 920, a displacement setscrew pin 922, a return spring 925, a plunger 930, a spring retainer 935, a retainer split 940, a modulation spring 945, a cup 950, a bias spring 955, a compliant washer 960, a Force Sensing Resistor (FSR) retainer 965, a FSR 970, and an adapter 975. All of these elements function generally similarly to those discussed above with regard to the JSE 100 of FIG. 3.

However, in the JSE 900 of FIG. 9, the boot 310 has been replaced by a spherical cup 910.

Additionally, the JSE 900 includes a variable feedback feel torque and latching system 901 including a spherical face coil assembly 996, a coil bracket 997, a snap retainer ring 998, a bracket bolt 999, a plastic cover 991, and a cover bolt 992.

In operation, the spherical face coil assembly 996 may be energized with electrical power. This creates an attractive force between the between cup 910 and the coil 996. The face of the coil 996 is spherical to match that on the inside of the cup.

In operation, the handle assembly 905 may be moved in any direction causing one or two of the force sensing cartridges 918 to deflect and create an output signal. The spherical cup 910 is preferably made from a magnetic material so the spherical coil 996 may produce a significant attractive force in order to restrict and/or control displacement of the handle assembly 905. This force may be at a large radius so that the resulting torque is high enough to hold the handle assembly at any angle. The snap retainer ring 998 holds the coil 996 close to the spherical cup 910 such that when there is an electric current directed to the coil and the cup they may contact and align centers. This allows one actuation direction to be held at any angle while an adjacent actuation direction may be made to move normally. Alternatively, an adjacent actuation direction may also be held at any angle. The hold at any angle forms the variable hold region. In one embodiment the operator may override this hold by moving the handle or by hitting a button to release or reduce the magnetic hold force.

In one embodiment, the angle of deflection selected for a hold region may be selected by a user of the handle assembly. For example, a user may enter an angle selection mode by positioning the handle assembly at a desired position and then actuating a button or switch. The selected angle may be determined by the force sensing cartridges and then stored. For example, the selected angle may be stored in a local control system, a memory, or an on-board CPU or the JSE 900 may be internally adjusted. Alternatively, the selected angle may be relayed to a remote communications and/or control system for storage and/or control of the JSE.

The coil bracket 997 positions the coils 996 so that the coils 996 contact the cup 910. The snap retainer ring 998 holds the coils 996 onto the coil bracket 997. The bracket bolt 999 attaches the coil bracket 997 to the JSE. The plastic cover 991 acts as a dust and moisture cover. The cover bolt 992 connects the plastic cover 991 to the JSE.

Figure 10:
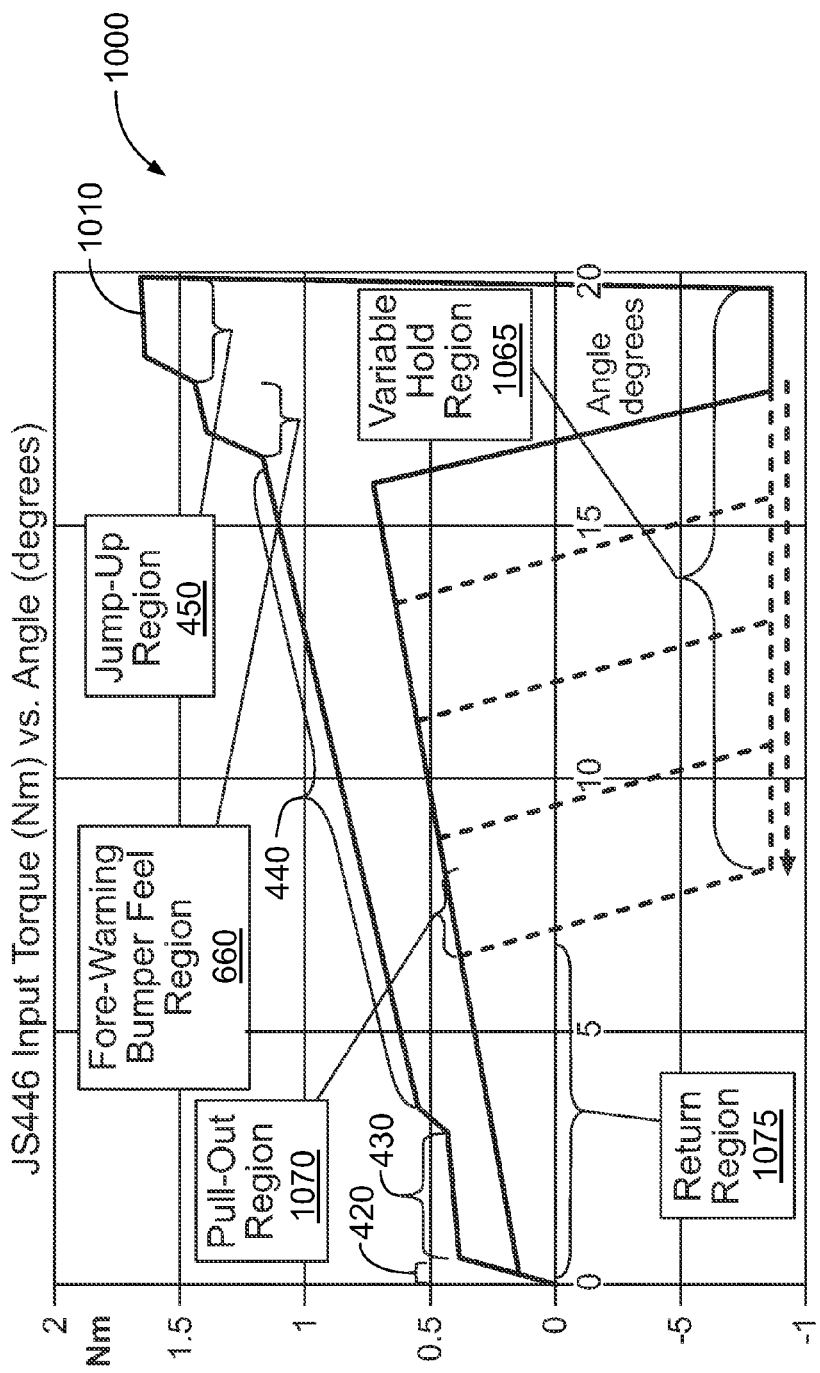
FIG. 10 is a diagram showing an input torque vs. angle of actuation curve, similar to that shown in FIG. 6.

FIG. 10 is a diagram 1000 showing an input torque vs. angle of actuation curve 1010, similar to that shown in FIG. 6. As with FIG. 6, the horizontal axis illustrates the angle degrees of displacement of the handle assembly from its initial position. The vertical axis illustrates input torque measured in Newton-meters. As shown in FIG. 10, the diagram 1000 includes the regions shown in FIG. 6 including a free play region 420, a dead band region 430, a modulation region 440 and a jump up region 450. Similarly, the fore warning bumper feel region 660 of FIG. 6 is also shown. However, FIG. 10 also includes a variable hold region 1065, a pull-out region 1070, and a return region 1075.

In operation, the fore warning bumper feel region 660 operates generally similarly to the fore warning bumper feel region 660 of FIG. 6, but while the fore warning bumper feel region 660 of FIG. 6 provides forewarning of the maximum angular displacement, the fore warning bumper feel region 660 of FIG. 10 indicates that a user may select any angle displacement to start receiving a fore warning bumper feel. This may be more productive on light weight material such as snow being handled by the vehicle.

Similarly, the variable hold region 1065 operates generally similarly to the hold region 670 of FIG. 6, but while the hold region 670 of FIG. 6 holds the JSE at the maximum angular displacement, the variable hold region 1065 indicates that a user may cause the JSE to hold at any user-selected angle of displacement.

Further, the pull-out region 1070 may be seen vary in angular displacement depending on the user's selection of the variable hold region. In the pull-out region 1070, the user applies a negative torque to overcome the hold of the handle assembly at a specific angular displacement. Next, in the return region 1075, the torque applies by the user again becomes proportional to angular displacement. In general the fore warning bumper may be electronically generated at any angle. Normally this is done just prior to a float or other function that might have sudden motion such as quick drop. Then once in a float function the handle may be held by the hold coil. This allows the float function to occur at any position that might be more efficient for the operating conditions, but still maintain the forewarning and hold features of a pre-set float. Also the float may be set at one angle with its own forewarning feel and then quick drop at another angle with its own forewarning feel. While one or both the float and the quick drops retain the hands off hold feature. Also the hold may be reduced such that the handle slides to a new reduced angle hold position. This may be used to optimize performance or limit engine lug for example. This slide action of the handle is another form of feedback to the operator. This may be used on repeated cycles to optimize performance of other criteria such as noise, emissions and fuel usage.

Figure 11:
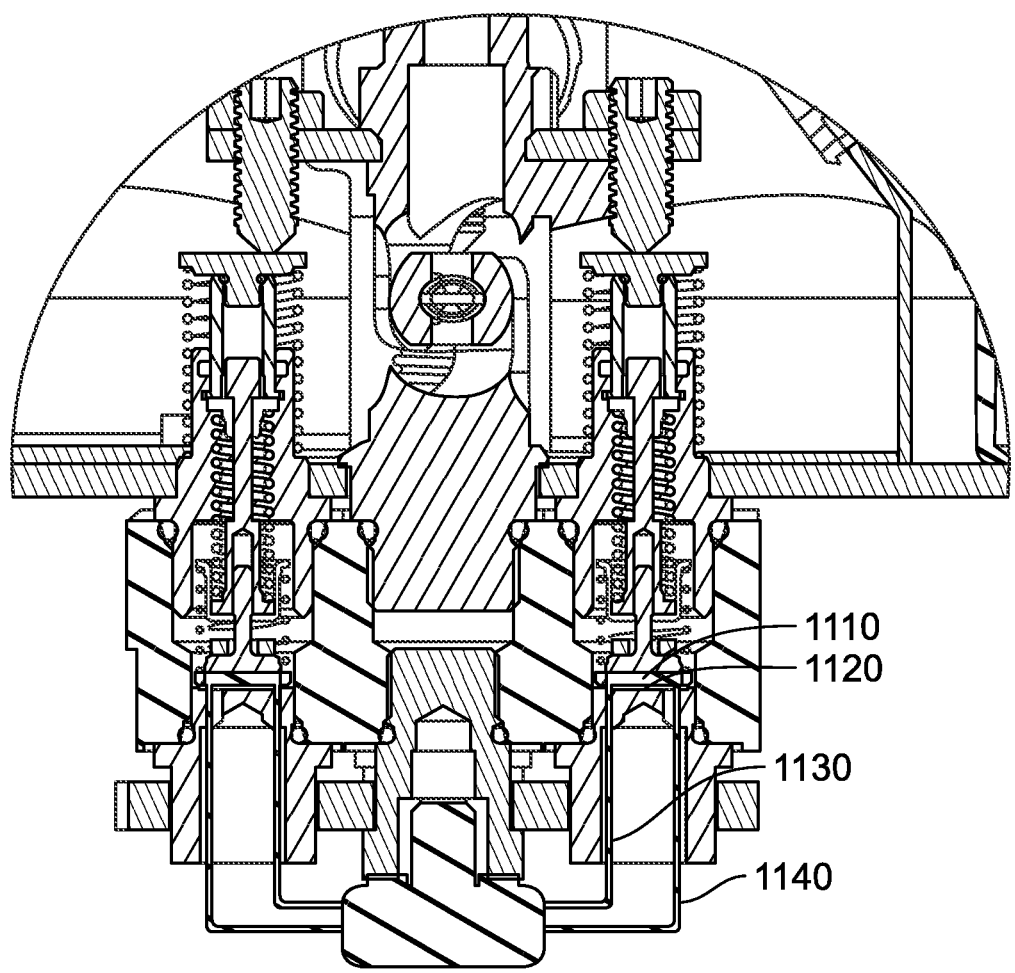
FIG. 11 illustrates automatic calibration, prognostic, and redundant sensors that may be added to any of the embodiments discussed above.

FIG. 11 illustrates automatic calibration, prognostic, and redundant sensors that may be added to any of the embodiments discussed above. FIG. 11 includes a primary FSR 1110, a secondary FSR 1120, a primary FSR wire connection 1112, and a secondary FSR wire connection 1122. Either or both of the FSRs may alternatively be a strain gage. But FSR have many cells and may have more of a gradual failure mode.

As discussed above, the JSE may have a redundant FSR. When the slope changes at the start position this may be calibrated using electronic null adjustment. Then, when the slope again changes at jump-up position this may also be sensed. The subtraction of the jump-up and the start position may be used as gain adjustment.

In one embodiment, in order to improve reliability the primary FSR 1110 may be accompanied by one or more secondary FSR 1120. These sensors 1110 and 1120 may be stacked on top of each other or in series. Redundancy for force sensing is in series whereas redundancy for position sensors is in parallel. The auto calibration of the primary FSR 1110 may be used to switch the output signal to the secondary FSR 1120. The initial near vertical slope in the output signal shown is FIG. 14 may be used to find the change in slope point by determining the point 1220 where the slope changes substantially. This point is used as an electronic null adjustment. The output changes slope again at point 1230. The difference between these two points 1220 and 1230 is used to calculate gain. The null and gain adjustments are used to improve the accuracy of the signal. This may adjust for normal and abnormal wear. For example, by gradually adjusting the gain upward to compensate for degradation. Then when the total adjustment reaches a predetermined level a prognostic signal may be generated. This may be used to signal the operator and or contact service or a service log. The prognostic signal may also be used to switch from the primary FSR 1110 to the secondary FSR 1120.

Figure 12:
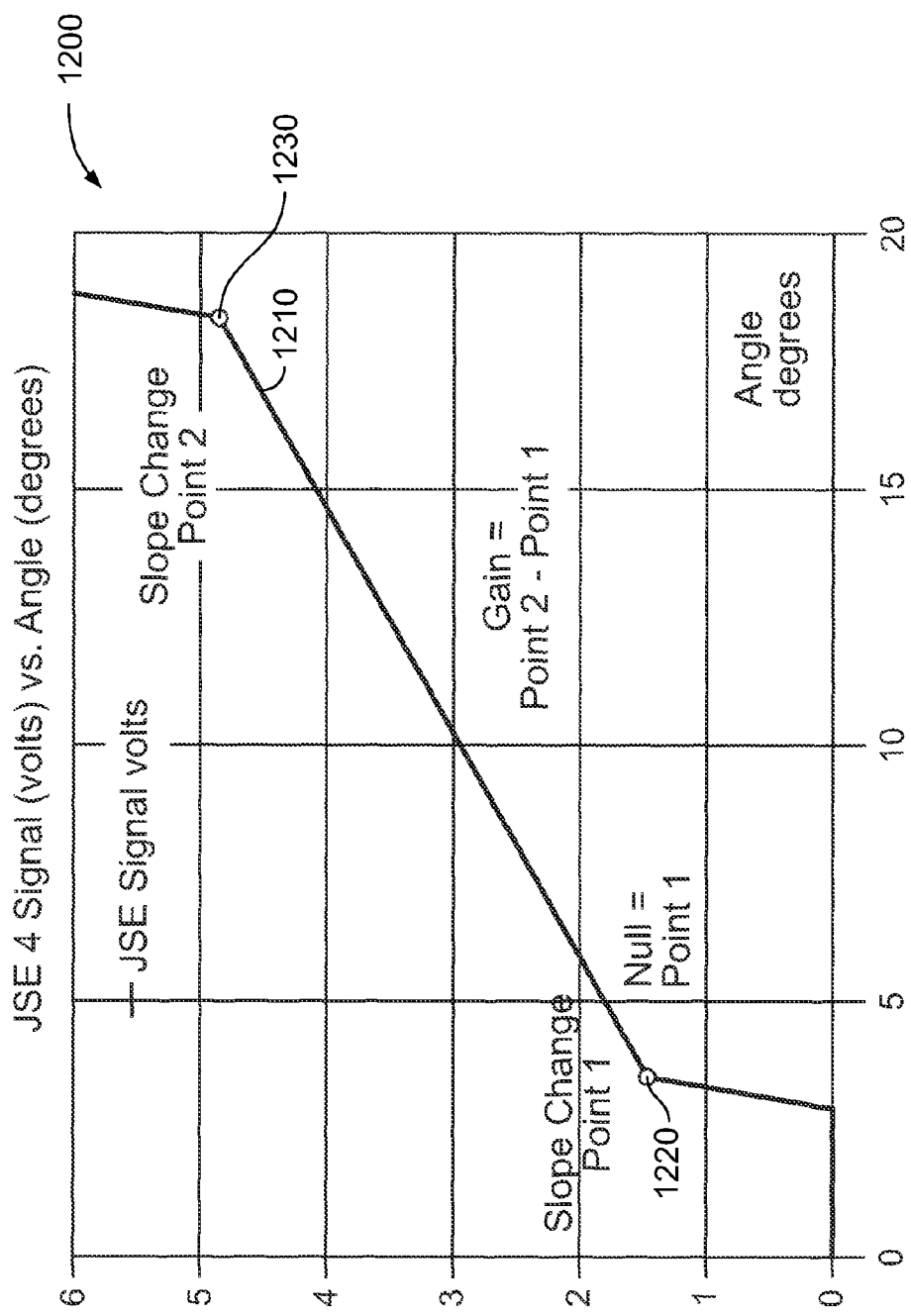
FIG. 12 illustrates a diagram showing a FSR voltage vs. angle curve including the first null inflection point and second null inflection point.

FIG. 12 illustrates a diagram 1200 showing a FSR voltage vs. angle curve 1210 including the first null inflection point 1220 and second null inflection point 1230. As discussed above subtraction of the first null point 1220 from the second null point 1230 provides a gain adjustment and/or calibration—in this case approximately 3.5 volts.

Additionally, when one or both of the null or gain adjustments exceeds a predetermined amount, the system may recognize that the JSE is nearing failure and/or should be replaced and transmit a prognostic service signal, for example to a control system or a maintenance system. Additionally or alternatively, the JSE may switch to the redundant FSR.

Figure 13:
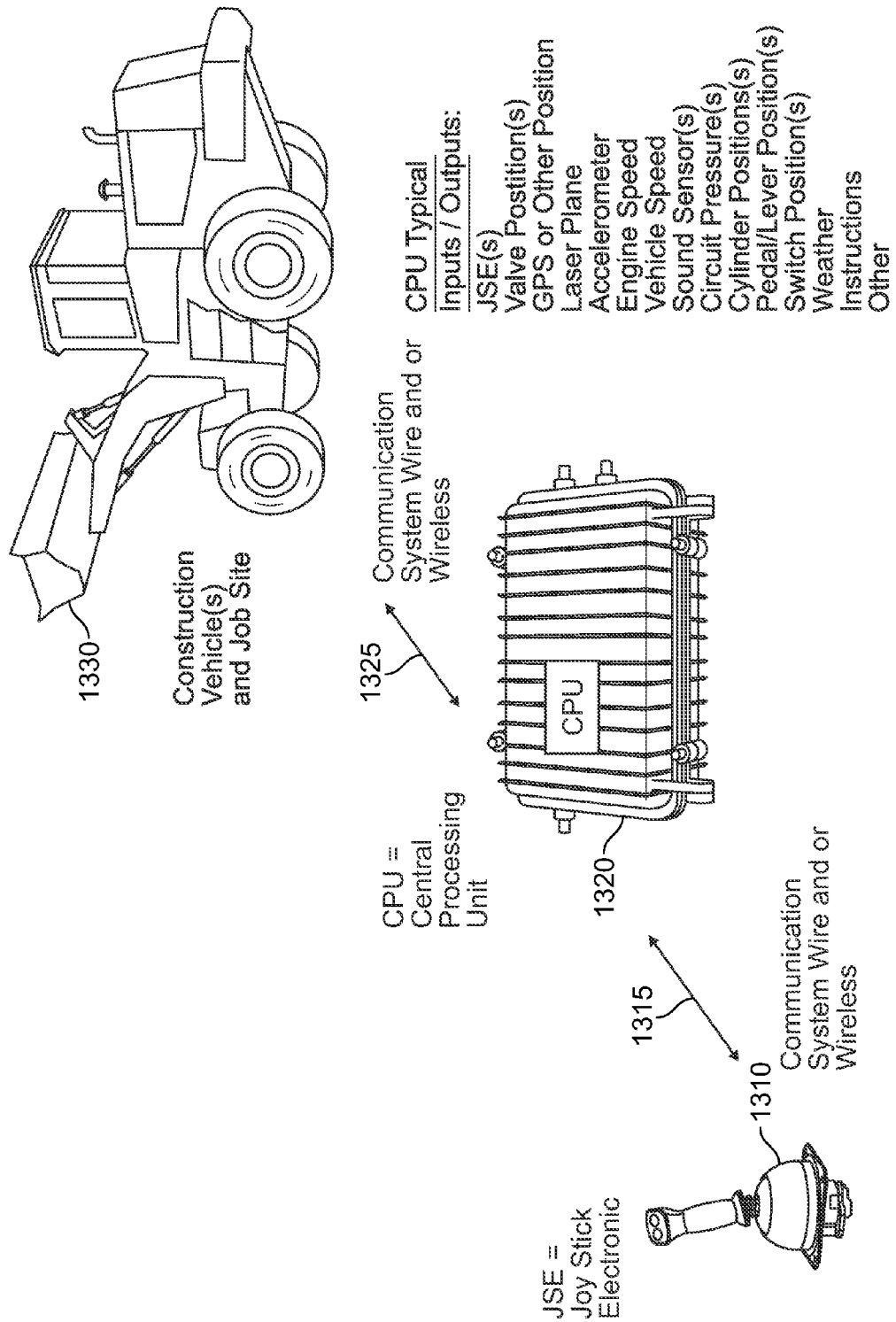
FIG. 13 illustrates how the present JSE may be used to remotely operate construction equipment at a job site.

FIG. 13 illustrates how the present JSE may be used to remotely operate construction equipment at a job site. FIG. 13 includes a JSE 1310, a central processing unit (CPU) 1320 in communication with the JSE 1310 over a CPU communication link 1315, and a remote machine 1330 such as a construction vehicle that is in communication with the CPU through a remote machine communication link 1325.

As illustrated in FIG. 13, the CPU may receive any of a number of sensor readings and/or other date from the remote machine such as valve positions, GPS or other positioning, laser plane, accelerometer, engine speed, vehicle speed, sound sensors, circuit pressures, cylinder positions, pedal and/or level positions, and switch positions. The sensor readings and/or other data may be interpreted by the CPU to provide feedback force to the JSE. Reciprocally, the CPU may translate signals from the JSE into commands to actuate one or more of the systems of the remote machine, such as varying a cylinder position, vehicle speed, or any of the other systems producing the sensor readings and/or data identified above.

Additionally, one or more JSEs may be employed to control one or more remote machines. Also, more than one CPU may be employed.

Figure 14:
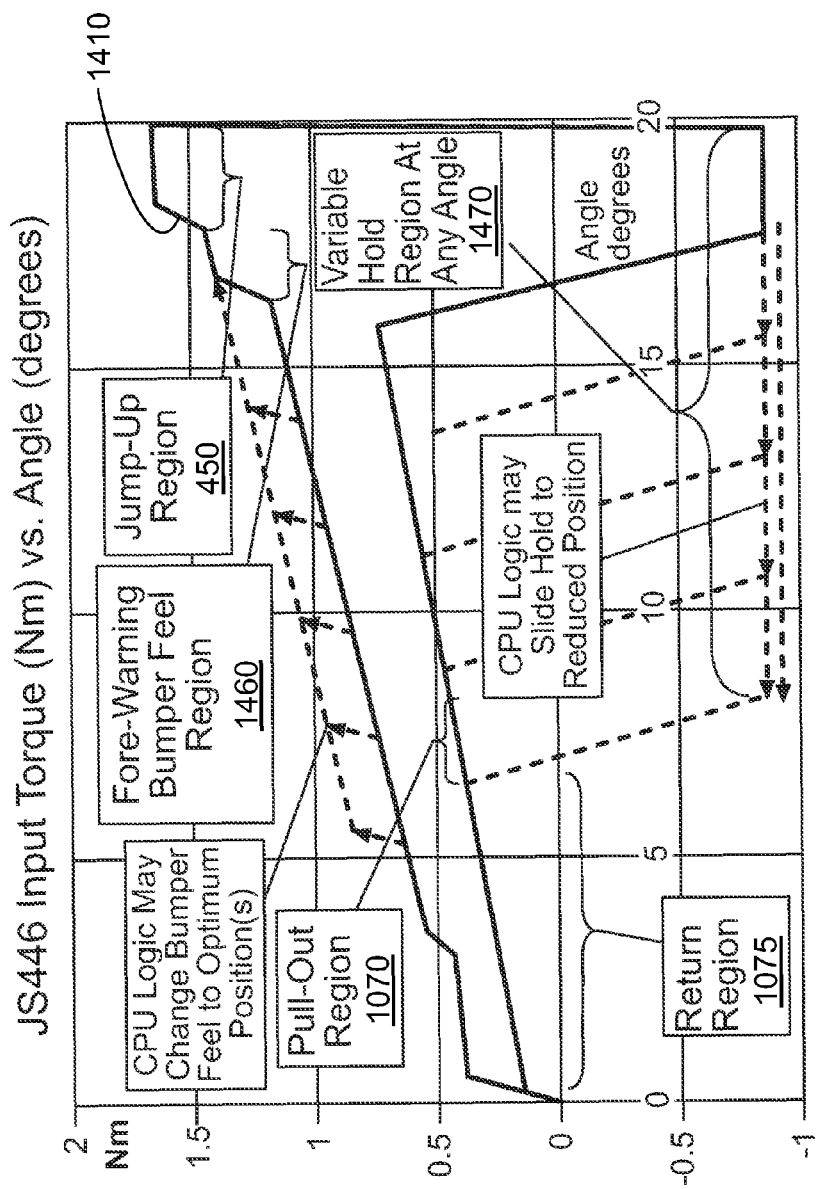
FIG. 14 is a diagram showing an input torque vs. angle of actuation curve, similar to that shown in FIG. 10.

FIG. 14 is a diagram 1400 showing an input torque vs. angle of actuation curve 1410, similar to that shown in FIG. 10. FIG. 14 includes a jump-up region 450, pull out region 1070, and return region 1075 similar to those shown in FIG. 6 above.

However, as shown in FIG. 14, the fore warning bumper feel at any angle region 1460 may be controlled by the CPU to take place at any angle that is determined by the CPU and several examples of angles that may be chosen by the CPU are shown in dotted lines. Additionally, the hold at any angle region 1470 may be controlled by the CPU to take place at any angle determined by the CPU and several examples of angles that may be chosen by the CPU are shown in dotted lines.

As noted in FIG. 14, the PCU logic may change the bumper feel to a determined position that may be optimal for a specific application. Additionally, the CPU logic may slide a hold to a reduced position.

The ability of the CPU to configure the angle at which the fore warning bumper feel at any angle region 1460 and hold at any angle region 1470 occur may be especially helpful to a remote user of the JSE because the JSE may provide force feedback that may allow the remote use to feel more like they are on-site operating the machine directly.

Stated another way, the force versus input lever angle curve shows that the forewarning bumper feel may be varied in position. Also a lever in a hold position may have the hold reduced until the lever slides to a reduced angle hold position. The CPU and operator may adjust the various bumper feel angles and the variable hold positions to optimize vehicle and job site performance.

Figure 15:
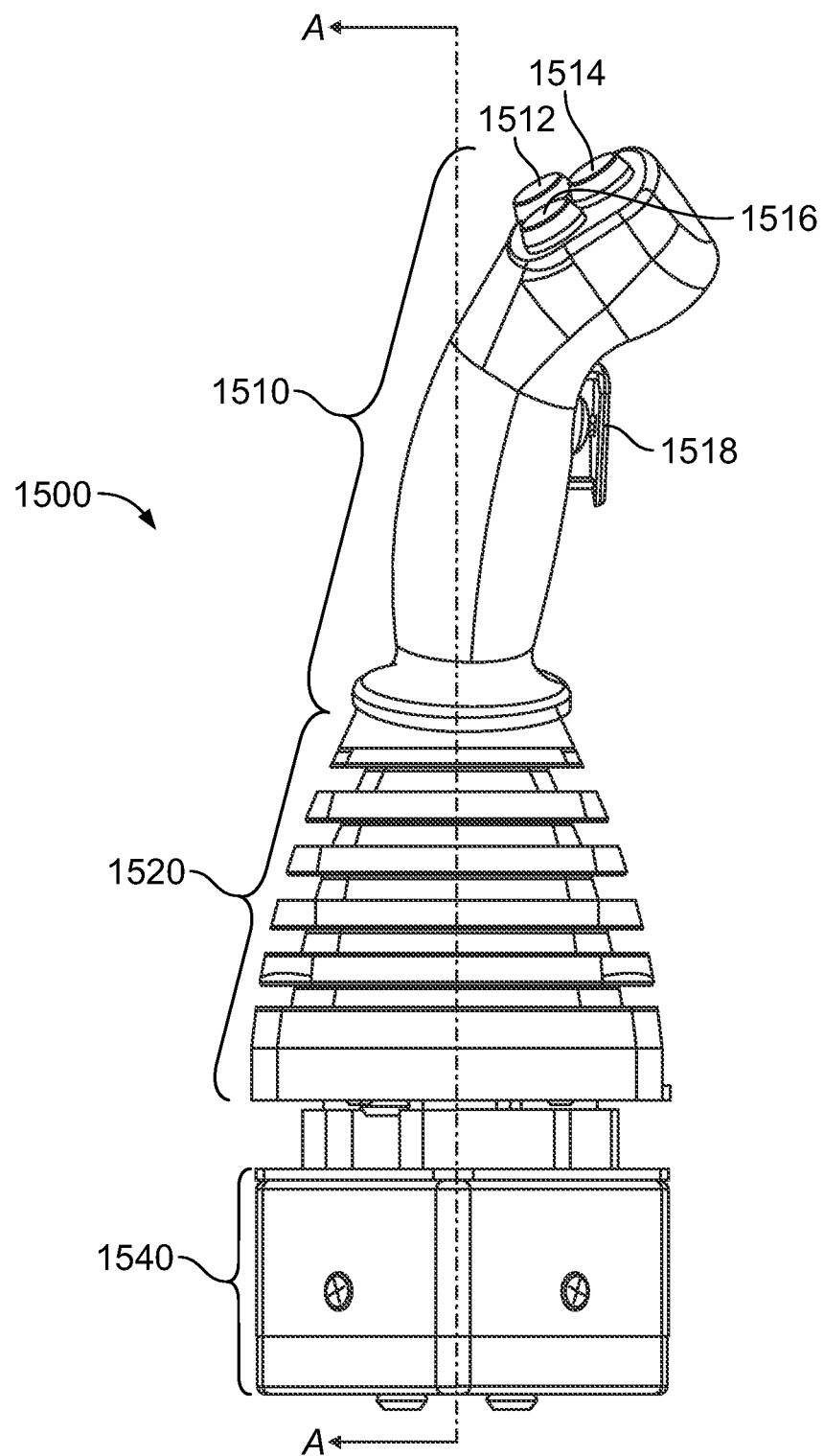
FIG. 15 illustrates an exterior view of a compact JSE according to one embodiment of the invention.

FIG. 15 illustrates an exterior view of a compact JSE 1500 according to one embodiment of the invention. The compact JSE 1500 includes a user interaction portion 1510, a flexible boot 1520, and a control portion 1540. Additionally, the user interaction portion 1510 includes a first top button 1512, a second top button 1514, a third top button 1516, and a trigger button 1518. This trigger may be used as a so called "deadman" switch for vehicles such as cranes. Other proportional switches known in the industry may also be configured.

Figure 16:
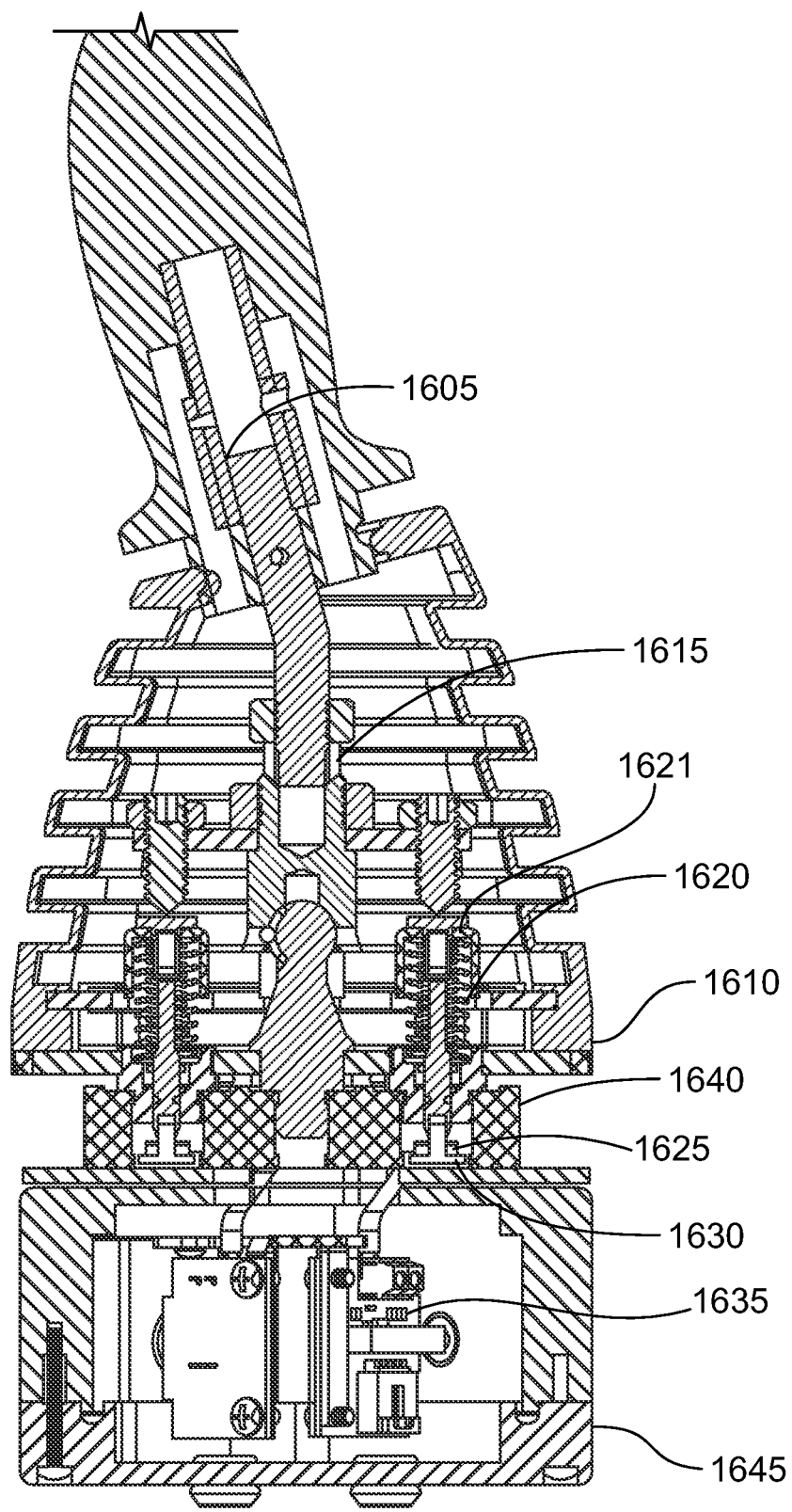
FIG. 16 illustrates a detailed view of the compact JSE of FIG. 15.

FIG. 16 illustrates a detailed view of the compact JSE 1500 of FIG. 15. As shown in FIG. 16, the compact JSE 1500 eliminates the bias spring and the other parts in the force sensing cartridge. The compact JSE 1500 also shows a spherical style pivot assembly as opposed to a U-joint style pivot shown in some other embodiments. Additionally the compact JSE 1500 may be substituted to function similarly to any embodiment disclosed herein.

As shown in FIG. 16, the compact JSE 1500 includes a handle assembly 1605, a boot 1610, a pivot assembly 1615, a force sensing cartridge 1620, a plug 1621, a compliant washer 1625, a FSR sensor 1630, a circuit board 1635, a body 1640, and an electronics container 1645.

In operation, the plug 1621 is forced down by increasing angular displacement of the handle assembly 1605. This force or torque is directly sensed by the force sensing cartridge 1620. The force sensing cartridge 1620 then relays a signal indicative of the sensed force to the electronics container 1645 where the signal may be further transmitted.

In one embodiment, FIG. 16 illustrates a compact electronic Joystick called herein as JSEC. This embodiment may be modified to perform the function outlined in the other embodiments. The JSEC is more compact and has fewer parts. The pivot joint shown may be a spherical type with a ball or pin to restrain twist motion of handle assembly 1605. This pivot joint has three parts instead of six parts in a typical U-joint style pivot. Additionally, the center pivot position is more exact than a U-joint. The boot 1601 may be replaced with the spherical cup allowing better alignment of centers. The force sensing cartridge 1620 has eliminated the cup and bias spring. The compliant washer 1625 may have a steel abutment face to improve cycle life. The FSR 1630 does not have sharp bend in the lead wire connection strip improving durability. The circuit board 1635 is packaged in a protective box 1645. The body 1640 is compact in size.

In one example, construction equipment may use pilot joystick and single axis pilot controls for operator input devices. The typical low efforts and feel feed back to the operator leads to less operator fatigue and higher productivity. This JSE may produce the same low efforts and operator feel feedback but produce an electric or electronic output signal. This may be used for remote control or lower cost wire versus pilot line routing.

Also the electric signal may be modified by other signals on the vehicle for added features. These include automated cycle and cut to grade using laser planes. The hold at full angle is a feature used on construction vehicles such as wheel loaders and dozers. This helps automate the loading cycle by predetermining the implement height and angle. This also helps hold the implement in float position. This reduces arm fatigue since the load to hold at an angle is done by the hold coil. Hystat drives use input joysticks that may have productivity benefits by providing hold at max angle. Buttons may be included on the handle just like on pilot controllers.

The variable feel feedback and hold at any angle provides more vehicle features. For example, if the ride is smooth the arm loads may be reduced. If the ride is rough the input torque may be increased. Additionally, a variable speed unit such as a winch and/or a crane may have the desired implement speed held and recalled by the electronic controls.

Also, an operator might have feel preferences so the vehicle may recall pre-set levels. The operator may use the other buttons or controls to adjust feel feedback amounts and positions to customize feel and optimize performance.

Additionally, different construction jobs are done by the same vehicle. The optimum input feel variables may be then changed for different vehicle job functions.

Also, a vehicle and job site task performance may be learned and improved by using the variable bumper feel feedback and the variable hold and lever slide to a reduced more optimum position. This allows more novice operators to more quickly learn to be more expert operators with improved vehicle performance measurements such as: dirt moved, fuel used, noise produced and time to produce the desired final land contours.

In one or more of the above-identified embodiments, although electronics may drift as much as 10-15%, the JSE auto-calibration may auto-calibrate to within 1-2%.

In one or more of the above-identified embodiments, in order to prevent overshoot and accidental operation of an opposite direction, the JSE may determine when the lever passes zero and a spike of hold force for a fraction of a second may be programmed in to be provided in order to prevent the actuation in the opposite direction. Further, the JSE may also detect when the lever is approaching zero and then dial in a force function of the operator's choosing or may provide a predetermined force function.

In one or more of the above-identified embodiments, the JSE force feedback may be adjusted based on the materials being processed. For example, when moving lighter materials, an operator may desire a higher force feedback. This may provide the operator with a greater sense of "feel" of the materials.

In one or more of the above-identified embodiments, when an operator is v-ditching a certain shape, for example, the contour of the ditching is typically the same. Consequently, the operator may program in the contour to the JSE for ease of actuation. The JSE may further be trained for other cycles desired by the operator.

Additionally, the JSE may learn such cycles through observation without operator control. For example, if the JSE recognizes that the operator is performing similar cycles, for example by monitoring the raising and lowering of the bucket and the accelerometer of the vehicle, then the JSE may provide an alteration to the force feedback curve to reduce operator strain/effort. The alteration may be provided automatically, may be configured to signal to an operator when the alteration is occurring, and/or may be an option selectable by an operator.

For example, the JSE may observe a sequence of 4-5 repetitions and may then be auto-calibrated to slide to a desired position and then hold. In one embodiment, the operator may simply let go while the JSE lever and/or tool such as bucket or blade, for example, are brought to or near to a pre-learned position.

Additionally, the JSE may use the predetermined sequence to slide to a lesser position that is more optimal to the observed cycle. For example, if an operator is considerably overshooting a dump height, the JSE may slide to the correct dump height.

Also, systems discussed above, such as with regard to FIG. 5, that include an electromagnetic system for providing force feedback to a user may be referred to as electromagnetic force feedback system While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A Joystick Electronic System (JSE) including:
   a handle assembly attached to a pivot assembly and rotating about a pivot point; and
   a force sensing cartridge including a plug and a force sensing resistor, wherein said handle assembly is rotated around said pivot point to bring said pivot assembly into contact with said plug,
   wherein continued rotation of said handle assembly causes said pivot assembly to exert a downward force on said plug,
   wherein said force sensing resistor determines the downward force exerted on said plug; and
   an electromagnetic force feedback system wherein said electromagnetic force feedback system receives an indication of the downward force exerted on said plug and uses said downward force indication to control the amount of downward force required to angularly displace said handle assembly,
   wherein, once a predetermined angular displacement has been reached by said handle assembly, said electromagnetic force feedback system nonlinearly increases the amount of downward force required to continue angularly displacing said handle assembly.

2. The JSE of claim 1 wherein said downward force indication is automatically calibrated by said electromagnetic force feedback system.

3. The JSE of claim 2 wherein when said downward force indication is automatically calibrated, a service prognostic signal is provided when said automated calibration includes an adjustment beyond a predetermined adjustment level.

4. The JSE of claim 2 wherein said automatic calibration causes said electromagnetic force feedback system to provide a plurality of pre-set non-linear force feedback regions based on angular displacement.

5. The JSE of claim 1 wherein said electromagnetic force feedback system provides a tactile feel to a user of a forewarning bumper.

6. The JSE of claim 1 wherein said electromagnetic force feedback system provides an actuation feel that may be increased at a plurality of angles.

7. The JSE of claim 1 wherein said electromagnetic force feedback system provides an angular hold to hold said handle assembly at a chosen angle.

8. The JSE of claim 7 wherein said electromagnetic force feedback system also provides a slide back feedback to a lower hold angle.

9. The JSE of claim 1 wherein said JSE communicates with a vehicle computer and with a job site computer that improves at least one of: productivity, safety, fuel, noise, emissions or other desired criteria.

* * * * *